Oct. 26, 1965

E. EBBESON ETAL 3,213,546

AUTOMATIC PLUMB BOB

Filed May 25, 1960

INVENTORS,
ERLING EBBESON,
LLOYD A. PETERSON.

BY Robert M. Dunning

ATTORNEY

Oct. 26, 1965   E. EBBESON ETAL   3,213,546
AUTOMATIC PLUMB BOB

Filed May 25, 1960   2 Sheets-Sheet 2

INVENTORS;
ERLING EBBESON,
LLOYD A. PETERSON.

BY Robert M. Dunning

ATTORNEY

United States Patent Office 3,213,546
Patented Oct. 26, 1965

3,213,546
AUTOMATIC PLUMB BOB
Erling Ebbeson, 5544 Morgan Ave. S., Minneapolis, Minn., and Lloyd A. Peterson, 1359 Lafond Ave., St. Paul, Minn.
Filed May 25, 1960, Ser. No. 31,654
2 Claims. (Cl. 33—217)

This invention relates to plumb bobs and deals particularly with a plumb bob having a self-contained drum for storing the plumbline when not in use.

The primary objective of this invention is to provide a plumb bob that will embody means whereby the plumb line is wound around a spring actuated drum within the body of the plumb bob. Plum bobs of this general character now in use embody means for adjusting and holding the plumb line in a selected position, this means requiring the use of both hands by the user. With this in mind the instant invention contemplates a plumb bob which includes adjusting means which may be manipulated by one hand instantaneously to lock the plumb bob in adjusted position on the line. These adjusting means include a threaded stem which is attached to the upper end of the plumb bob. An axial opening through the stem communicates with a recess within the body of the plumb bob. This recess contains the spring loaded drum around which the plumb line is wound. The plumb line extends upwardly through the axial opening in the stem. A transversely disposed aperture in the stem is arranged to intersect the axial opening tangentially. A pin inserted into the transverse aperture is provided with a groove which is arranged in vertical alignment with the axial opening allowing the plumb line to extend through the entire length of the stem. The pin is rotatable in the stem and upon rotation the plumb line will become wedged between the surface of the pin and the annular wall of the transverse aperture thereby holding it in one position. The pin is provided with a thumb projection for manipulation by the user.

These and other objects and advantages will become apparent from the following description taken in connection with the drawings wherein.

Figure 1:
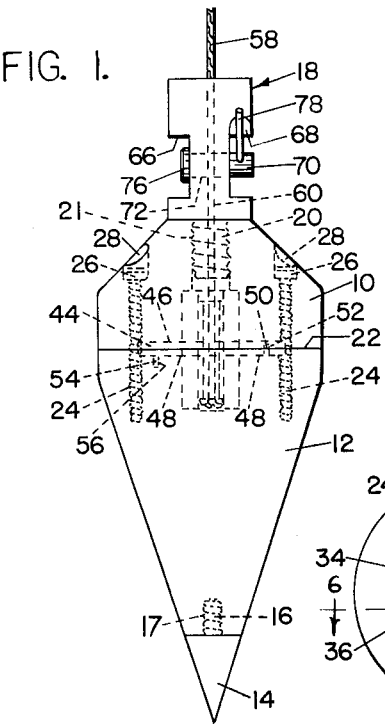
FIGURE 1 is a side elevation on the improved plumb bob.

The plumb bob is formed of two sections, an upper and a lower section indicated in general by the numerals 10 and 12 respectively. The lower section 12 is provided with the usual conical point 14 which is attached thereto by a threaded shank 16 extending into an axial threaded socket 17 in the lower section 12.

The upper section 10 is provided with an axially located stem 18 which is attached thereto by a threaded shank 20 which extends into an axial socket 21 in the upper portion 10. As is best seen in FIGURES 1 and 2 the two sections are joined together at a parting line 22 and are held together by a pair of elongated diametrically opposed screws 24 having heads 26 which are countersunk in recesses 28 in the upper section 10.

Each section 10 and 12 is provided with a semi-cylindrical recess 30 which, when the sections are connected together, form an interior cylindrical chamber into which is placed a spring actuated drum generally indicated by the numeral 32. The drum 32 is shown in detail in FIGURE 3 and includes a pair of coil springs 34 and 36 which are housed in similar disc-like chambers 38 and 40, one end of each spring being secured to a side of the drum 42. The chambers 38 and 40 are within the drum 32 and the drum 32 is rotatably carried by a fixed shaft 44 which is supported in opposed semi-cylindrical grooves 46 and 48 in the opposed surfaces of the sections 10 and 12. The shaft 44 is held from movement relative to the plumb bob sections 10 and 12 by a pin 50 extending upwardly from the groove 48 into a bore 52 in the shaft. On the opposite side of the drum 32 a pin 54 on the shaft 44 extends into a bore in the recess 48. The plumb line 58 is wound around the drum 42 and extends upwardly through an axial bore 60 in the stem 18.

Figure 3:
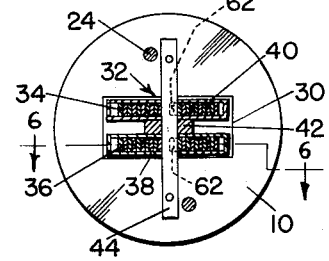
FIGURE 3 is a transverse sectional view taken on line 3—3 of FIGURE 2.
Figure 6:
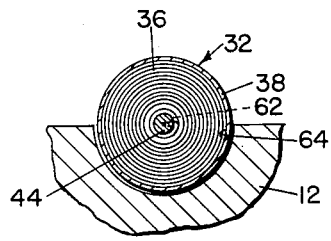
FIGURE 6 is a sectional side view of the drum showing that portion of the drum housing a coil spring.
Figure 7:
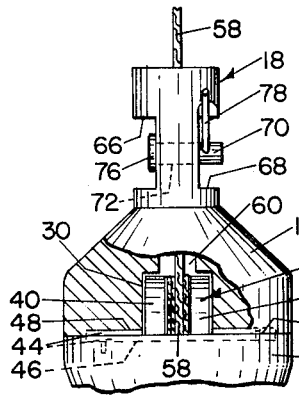
FIGURE 7 is a side elevation of the upper portion of the plumb bob showing portions thereof in section.
Figure 8:
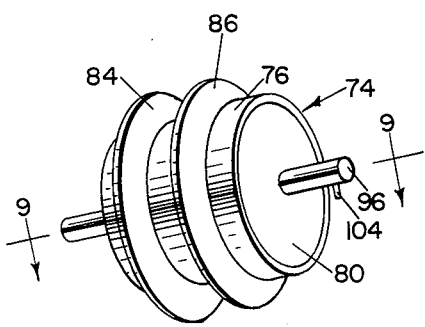
FIGURE 8 is an enlarged perspective view of a modified form of drum construction employed in the plumb bob.
Figure 9:
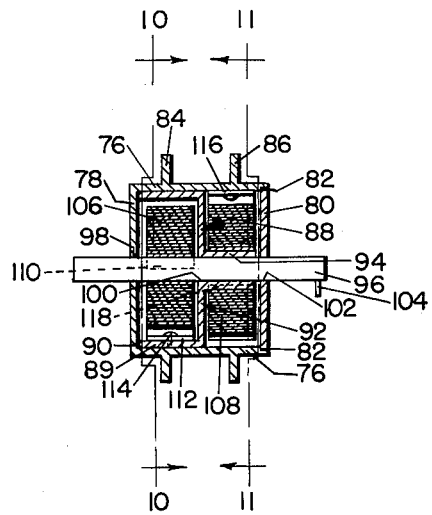
FIGURE 9 is a transverse sectional elevation of the drum as shown in FIGURE 8.
Figure 10:
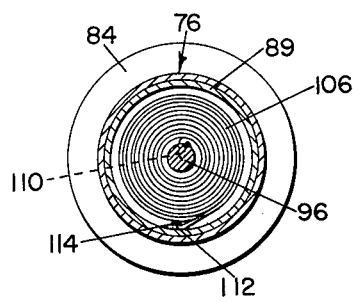
FIGURE 10 is a vertical sectional elevation of the drum, section being taken substantially on line 10—10 of FIGURE 9.
Figure 11:
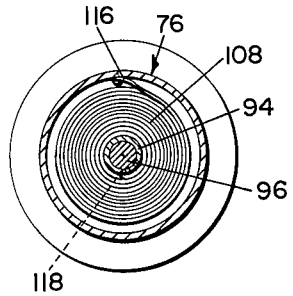
FIGURE 11 is a view similar to FIGURE 10, the section being taken substantially on line 11—11 of FIGURE 9.

As best seen in FIGURES 3 and 6 the ends 62 of the coil springs 34 and 36 are connected to the outer periphery of the shaft 44. The opposite ends 64 are connected to the inner periphery of the drum chambers 38 and 40. It will be understood that one of the coil springs may be omitted should the desired tension on the plumb line be attained with the use of one coil spring. If such be the case the side of the drum 42 opposite the side which carries the spring and its housing must be provided with a disc to counter-balance the weight of the spring, so that the plumb line will remain in place upon the drum.

Figure 2:
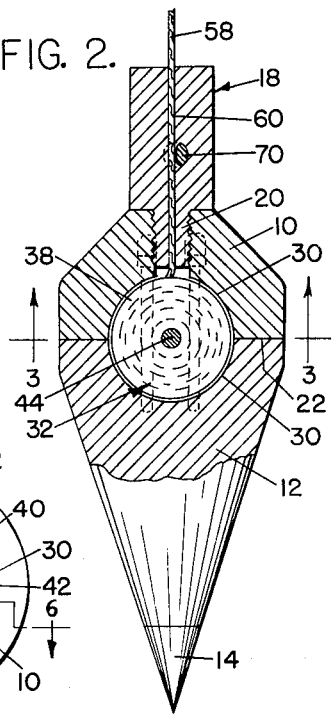
FIGURE 2 is a side elevation partly in section, said section being taken at right angles to the view shown in FIGURE 1.
Figure 4:
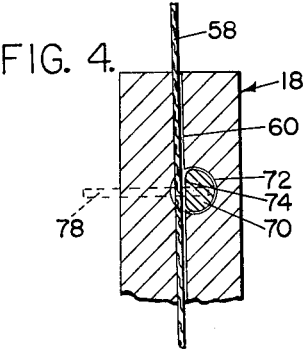
FIGURE 4 is an enlarged fragmentary vertical sectional view of the stem of the plumb bob showing the adjusting means employed therein.
Figure 5:
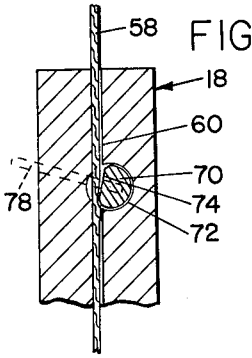
FIGURE 5 is a view similar to FIGURE 4 showing the adjusting means in an engaged position.

The means for adjusting and holding the plumb line in one selected position is best illustrated in FIGURES 1, 4 and 5. The stem 18 is notched at 66 and 68 to provide suitable parallel surfaces through which a pin 70 is inserted through a transverse aperture 72 in the stem 18. As best seen in FIGURES 4 and 5 the aperture 72 is located so as to intersect the axial bore 60 substantially tangentially thereto. The pin 70 is provided with a groove 74 intermediate its ends and in vertical alignment with the bore 60. As seen in FIGURE 4 this allows the plumb line 58 to pass without interference through the bore 60 and out the top of the stem 18, when the groove 74 registers therewith. The pin 70 is rotatable in the aperture 72 and when rotated in either direction (as best seen in FIGURE 5) the plumb line will become wedged between the edges of the groove and the bore 60 thus retaining the plumb line in fixed position anywhere along its length. The pin is held from lateral movement by an enlarged head 76 on one end and radially extending arm or thumb projection 78 on the other end.

After the plumb line is extended and locked in a desired position, the plumb bob may be used in the usual manner. Upon release of the arm 78 into the position shown in FIGURE 4, the line will automatically rewind onto the drum 42.

A modified form of drum structure is illustrated in FIGURES 8, 9, 10, and 11. The primary purpose of this type of drum is to permit additional line to be added to the drum. The use of the modified form of drum will enable a user to use the plumb bob in certain situations where more than the conventional lengths of line are needed.

The drum is generally indicated by the numeral 74 and includes a cylindrical housing 76 having a closed end 78 and an open end which is closed by a plug or disc 80. When assembled the plug 80 is welded, soldered, or otherwise secured to the housing on the seat 82.

The exterior of the drum is provided with spaced flanges 84 and 86 which extend radially from the drum surface to provide walls between which the plumb line, not shown, is held.

The interior of the drum 74 is provided with an interior drum 88 having a cylindrical wall 89 which fits within the inner annular walls of the outside housing 76. The open end of the drum 88 abuts the closed end 78 of the housing 76 as at 90. The opposite side of the drum 88 or the closed end 92 is provided with an axial sleeve 94 extending outwardly from the drum.

A fixed shaft 96, similar to the shaft 44, extends through an axial aperture 98 in the closed end 78 of the housing 76; through an aperture 100 in the closed end 92 of the interior drum 88; and through the sleeve or hub 94. The shaft 96 further extends through an axial aperture 102 in the cap 80.

The drum 74 is held in the plumb bob in the same manner utilized to secure the drum 32 therein. The pin 104 extends into an aligned socket in the portion 12 of the plumb bob and a pin, not shown, on the plumb bob extending into a socket in the shaft 96 also not specifically shown.

The drum 74 is provided with a pair of coil springs 106 and 108. The spring 106 is held in the interior drum 88 having one end 110 secured to the shaft 96 and the opposite end 112 held by a rivet 114 or the like to the inner annular wall of the drum 88.

The spring 108 is housed in the interior of the drum 74 having one end 116 secured directly to the housing 74 and the other end 118 secured to the sleeve 94.

It will be noted that the drum 88 is free to rotate within the drum 74 and upon the fixed shaft 96 so that upon rotation of the drhm 74 the two springs 106 and 108 act as one spring theoretically, having one end, the end 116, secured to the drum 74 and its other theoretical end 110 secured to the shaft.

This arrangement permits the drum 74 to make many more rotations than the drum 32 illustrated in FIGURES 1 through 7. Obviously more plumb lines may be utilized when the drum 74 is embodied in the plumb bob.

In accordance with the patent statutes, we have described the principles of construction and operation of our improvement in automatic plumb bob, and while we have endeavored to set forth the best embodiment thereof, we desire to have it understood that changes may be made within the scope of the following claims without departing from the spirit of our invention.

We claim:
1. A plumb bob including a symmetrical plumb bob body having a chamber therein symmetrically arranged about the vertical axis of the body, a fixed shaft extending transversely across said chamber intersecting the axis of said body, a spring reel rotatably supported on said shaft and including a cylindrical drum and parallel end closures encircling said shaft, a pair of parallel peripheral flanges on said drum equally spaced from said end closures, and an inner drum within said outer drum between said end closures and including a central disk, a sleeve freely encircling said shaft and extending in one direction from said disk, and a cylindrical flange extending in the opposite direction from the periphery of said disk, the disk forming two spaced spring chambers, a torsion spring on one side of said disk connected at its inner end to said sleeve and at its outer end to said first named drum, and a second torsion spring connected at its inner end to said shaft and at its outer end to said cylindrical flange, said plumb bob body having an axial opening through the upper end thereof communicating with said chamber, and a plumb bob line secured to said first named drum and extending through said axial aperture, said plumb bob body including an upper section and a lower section the two sections abutting on a plane normal to the axis of the body and through the axis of said shaft, the abutting surfaces including semi-cylindrical opposed grooves for accommodating the ends of said shaft, means for connecting the sections in abutting relation, said fixed shaft having a pin extending radially therefrom near an end thereof, and said body including a socket into which said pin extends to hold said shaft from rotation.

2. A plumb bob including a symmetrical plumb bob body having a chamber therein symmetrically arranged about the vertical axis of the body, a fixed shaft extending transversely across said chamber intersecting the axis of said body, a spring reel rotatably supported on said shaft and including a cylindrical drum and parallel end closures encircling said shaft, a pair of parallel peripheral flanges on said drum equally spaced from said end closures, and an inner drum within said outer drum between said end closures and including a central disk, a sleeve freely encircling said shaft and extending in one direction from said disk, and a cylindrical flange extending in the opposite direction from the periphery of said disk, the disk forming two spaced spring chambers, a torsion spring on one side of said disk connected at its inner end to said sleeve and at its outer end to said first named drum, and a second torsion spring connected at its inner end to said shaft and at its outer end to said cylindrical flange, said plumb bob body including an upper section and a lower section the two sections abutting on a plane normal to the axis of the body and through the axis of said shaft, means on said plumb bob body supporting said shaft on said plane intersecting the axis of said body at right angles thereto, and cooperable means on said plumb bob body and said shaft holding said shaft from rotation, an axially extending stem projecting upwardly from the upper section and having an axial aperture extending therethrough, said stem having a pair of opposed notches in opposite sides thereof having parallel base surfaces, a pivotal pin extending through said parallel surfaces on an axis normal thereto and intersecting said axial aperture, said plumb bob line extending through said axial aperture, said pin having a groove therein intermediate its ends thereof in axial alignment with said axial aperture in one pivotal position of said pin, a handle on said pin by means of which it may be pivoted about its axis, said handle being engageable with said stem at opposite ends of one of said notches in said stem to limit pivotal movement of said pin, said pin clamping said line when said groove in said pin is pivoted out of alignment with said axial aperture.

References Cited by the Examiner

UNITED STATES PATENTS

| 599,178 | 2/98 | Gwilliam et al. | 33—217 |
|---|---|---|---|
| 1,090,015 | 3/14 | Birchbauer | 33—217 |
| 1,369,523 | 2/21 | Easterberg et al. | 33—217 |
| 1,803,481 | 5/31 | Minty | 242—107.5 |
| 1,878,041 | 9/32 | Voss. | |
| 2,445,332 | 7/48 | Nelson | 33—217 |
| 2,784,498 | 3/57 | Fleming | 33—217 |

FOREIGN PATENTS 972,955   9/50   France.

ISAAC LISANN, *Primary Examiner.*

ROBERT L. EVANS, *Examiner.*